United States Patent
Lackner et al.

[11] 4,106,063
[45] Aug. 8, 1978

[54] CIRCUIT ARRANGEMENT FOR A DROPOUT DETECTOR

[75] Inventors: Robert Lackner; Harald Melwisch; Helfried Kurzmann, all of Vienna, Austria

[73] Assignee: U.S. Philips Corporation, New York, N.Y.

[21] Appl. No.: 701,250

[22] Filed: Jun. 30, 1976

[30] Foreign Application Priority Data
Jul. 10, 1975 [AT] Austria .................................. 5346/75

[51] Int. Cl.² ............................................. H04N 5/78
[52] U.S. Cl. ................................................... 360/38
[58] Field of Search ................. 360/38; 358/127–128, 358/8

[56] References Cited
U.S. PATENT DOCUMENTS

| | | | |
|---|---|---|---|
| 3,328,521 | 6/1967 | Moskovitz | 360/38 |
| 3,824,620 | 7/1974 | Langer | 360/38 |
| 3,925,605 | 12/1975 | Rennick | 360/38 |

Primary Examiner—Raymond F. Cardillo, Jr.
Attorney, Agent, or Firm—Frank R. Trifari; Simon L. Cohen

[57] ABSTRACT

In a circuit arrangement for a dropout detector for the detection of dropouts in signals which are reproduced from a record carrier, the signal path includes an amplitude discriminator before the threshold device which supplies a switching signal in the event of a dropout, the discriminator characteristic between two threshold levels of the output signals having a steep edge for amplitude discrimination in whose range the signal level which is decisive for the actuation of the threshold device is situated.

6 Claims, 4 Drawing Figures

CIRCUIT ARRANGEMENT FOR A DROPOUT DETECTOR

The invention relates to a circuit arrangement for a dropout detector for detecting dropouts in the reproduction of signals which are recorded on a record carrier. In particular it relates to video signals. The signal path of the detector includes a threshold device which determines when a predetermined signal level is passed in either sense and which supplies a switching signal depending on its actuation.

As in a circuit arrangement of this type which is destined for use in a dropout compensator, the threshold device determines when a signal is to be regarded as one afflicted with a dropout, its exact actuation upon the attainment of the predetermined signal level is of particular importance in order to ensure that a dropout is always detected under the same conditions. Such a threshold device for example consists of a bistable circuit, which has a conductive and a non-conductive state, depending on whether the level of the signal applied to it falls below or exceeds a threshold value. Such threshold devices may consist of a tunnel diode, a Schmitt trigger or the like. Threshold devices of this type have the property that for changing from the conductive to the non-conductive state and conversely, from the non-conductive to the conductive state, two mutually different threshold values are decisive, which is termed hysteresis. In a dropout detector care must be taken that the hysteresis of the threshold device is minimal, in order to ensure that the beginning and the end of a dropout is always detected at the same signal level. Moreover, the actuation of a threshold device is always subject to certain tolerances, which depend on the threshold device itself and the circuit elements associated with it. Therefore, it is to be taken into account that the criterion for the actuation of the threshold device is always constituted by a specific range of signal levels. For this reason it is frequently necessary to provide manually controlled adjusting elements, by means of which the threshold value of the threshold device which detects whether the signal drop, below a predetermined, signal level, can be exactly defined. In addition to increased costs for circuit elements the provision of these elements complicates mass production.

In accordance with the invention these problems are eliminated in a simple manner in a circuit arrrangement for a dropout detector of the type mentioned in the preamble in that the input circuit of the threshold device includes an amplitude discriminator whose discriminator characteristic between two threshold levels of the output signal exhibits a steep edge for amplitude discrimination, in whose range the signal level which is the criterion for the actuation of the threshold device is situated. Thus, it is ensured that already a small variation of the signal level at which a dropout is to be detected gives rise to a large variation in the level of the signal which is applied to the threshold device, so that the tolerance limits for the actuation of the threshold device are non-critical.

Such an amplitude discriminator may be realized in a variety of ways in accordance with the state of the art. For this purpose it is for example possible to provide several series connected amplifier stages, whose gain is limited in accordance with the desired threshold levels by means of diode networks included in voltage dividers. An operational amplifier may be used. For a circuit arrangement in accordance with the invention it is found to be particularly advantageous if as an amplitude discriminator two amplifiers with different signal limiting levels are provided, which supply equal output signals in the linear amplification range which is common for the two amplifiers, which amplifiers are arranged for mutual compensation. Such an amplitude discriminator is of simple design and can also be dimensioned simply with respect to the desired shape of the discriminator characteristic and the required bandwidth. In this respect it has been found to be advantageous when each of the two amplifiers is constituted by a differential amplifier which is energized by a constant-current source, when the two constant-current sources supply limiting currents which differ by a predetermined factor, when the input signals applied to the inputs of the two differential amplifiers differ by the same factor, the smaller input signal being applied to the differential amplifier which is energized by the constant current source with the larger limiting current, and when the two differential amplifiers have common load resistors across which the output signals appear in phase opposition. Such an amplitude discriminator can be realized in a very simple manner in integrated circuit technology, so that the complete circuit arrangement for a drop-out detector can also take the form of an integrated circuit.

The invention will be described in more detail with reference to the drawings, which show some embodiments to which the invention is not limited.

Figure 1:
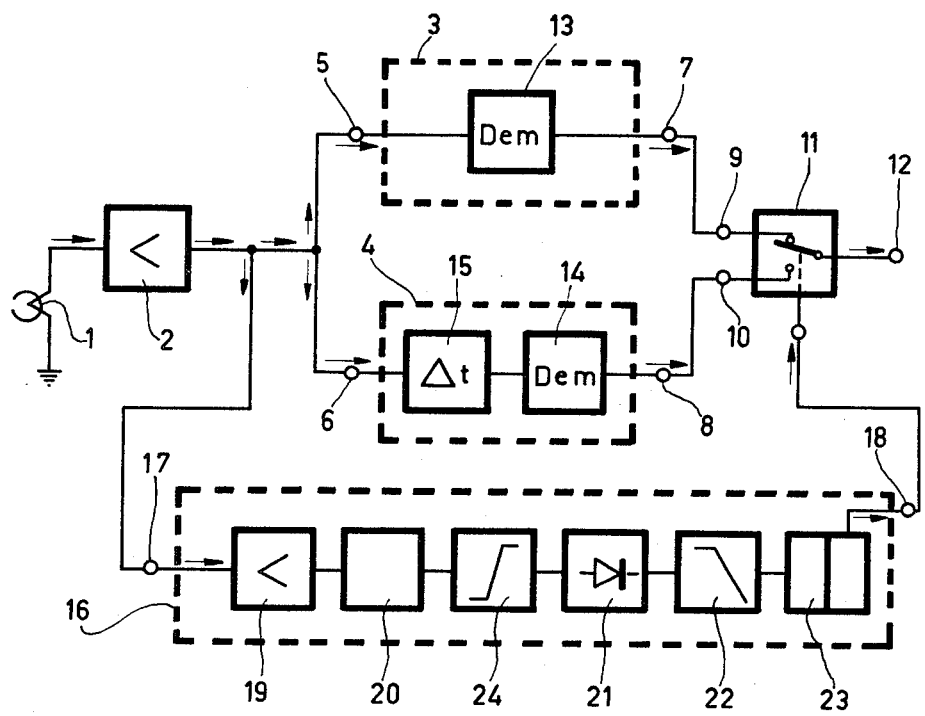
FIG. 1 shows the complete block diagram of a dropout compensator with a dropout detector, whose signal path includes an amplitude discriminator.

In FIG. 1 the reference numeral 1 designates a magnetic head which serves for scanning a record carrier on which signals are magnetically stored. The signals, as is assumed by way of example in the present example and as is common in recording video signals, are modulated on a carrier wave as a phase modulation or specifically as a frequency modulation. The recording method is not limited to magnetic methods, but may be effected in the most different ways, for example in that a record carrier is influenced by radiant power in accordance with known methods. The signal which is obtained with the aid of the magnetic head 1 during reproduction and which is still modulated on the carrier wave, is applied to the circuit arrangement for dropout compensation via an amplifier 2 which may also include filters and the like. This circuit arrangement comprises a first transmission channel 3 and a second transmission channel 4, whose two inputs 5 and 6 are interconnected and are connected to the output of the amplifier 2. The outputs 7 and 8 of the two transmission channels each lead to an input 9 and 10 respectively of an electronic switch 11, which has a single output 12. The two transmission channels each include a demodulator 13 and 14 respectively, so that the two inputs of the switch 11 receive signals which are already demodulated. The transmission channel 3 serves for the normal transmission of the signal, while the transmission channel 4 includes a delay circuit 15 before the demodulator 14, which delays the signal, which is still modulated on the carrier wave, by a predetermined amount of time. In its rest position the electronic switch 11 connects the input 9 which is connected to the transmission channel 3 to the output 12, so that the normal signal which is taken from the record carrier is available at said output for further processing.

For setting the electronic switch 11 to the position in which the input 10 which is connected to the transmission channel 4 is connected to the output 12, a dropout detector 16 is provided whose input 17 is also connected to the output of the amplifier 2. By means of the dropout detector it is ascertained whether the signal which is obtained from the record carrier contains a dropout or not. If a dropout appears, the dropout detector produces a switching signal at its output 18, which changes over the electronic switch for at least the duration of this disturbance, the signal stored in the transmission channel 4 then appearing at the output 12 of the dropout compensator. Thus, as is known, the disturbed part in the normal signal is replaced by a signal which appeared an amount of time earlier corresponding to the delay in the transmission channel 4, which signal is very unlikely to be disturbed. In the case of a circuit arrangement for processing video signals, the delay time is suitably selected to equal the line period, so that disturbances in one line are replaced by the picture contents of the preceding line. It is evident that the dropout detector need not necessarily be connected to the output of the amplifier 2, but that the signal afflicted with dropouts might also be applied to it from another suitable point in the circuit arrangement, for example directly from the magnetic head 1. Similarly, it is evident that a different method of dropout compensation per se may be selected, such as for example the insertion of a specific constant signal level for the duration of a dropout.

With the dropout detector 16 it is thus ascertained whether there is a break in the amplitude of the signal which is taken from the record carrier, the detector operating essentially as an envelope detector. For this purpose, an amplifier 19 is included in the signal path of the dropout detector, which, as the case may be with the inclusion of a circuit arrangement 20 for a specific signal processing, as for example a filter or attenuator, is followed by a rectifier circuit 21, whose output signal via a low-pass filter 22 is applied to a threshold device 23, which for example takes the form of a Schmitt trigger, which in its turn provides the switching signal at the output 18 of the dropout detector. If a signal without dropout appears, this will have a specific signal level, which causes such an output signal of the rectifier circuit 22, which does not cause the threshold device 23 to respond, because it exceeds the threshold value. This threshold value which defines a specific signal level has been selected so that upon the occurrence of a correspondingly strong dropout, which owing to the break in the envelope of the signal causes the output voltage of the rectifier circuit to decrease, the threshold device is actuated as soon as a value below this specific signal level is reached. The detection of the beginning of a dropout is consequently determined by the decrease of the signal level to such a value that it falls below the relevant threshold value of the threshold device.

A threshold device which consists of a bistable circuit, exhibits a specific hysteresis with respect to its actuation so that one threshold value is decisive for the detection of a signal variation in one direction and another threshold value for a subsequent signal variation in the opposite direction which value slightly differs from the said first threshold value and depends on the properties of the threshold device. As a result, the end of a dropout is defined by a signal level which accordingly differs slightly from the signal level which characterizes the beginning of a dropout. Although for a dropout detector the threshold value, which determines the detection of the beginning of a dropout, is of primary importance, it is to be taken into account that in all a specific range of signal levels is decisive for the actuation of the threshold device.

However, the threshold values of threshold devices are also subject to tolerances, which are caused by the threshold device itself or by the circuit elements cooperating with it. However, this means that the range of signal levels within which the threshold device can respond, is further increased. However, this results in an inaccuracy in the detection of a dropout, because large variations of the signal level are required, in order to cover the range in which the threshold device can respond.

Figure 2:
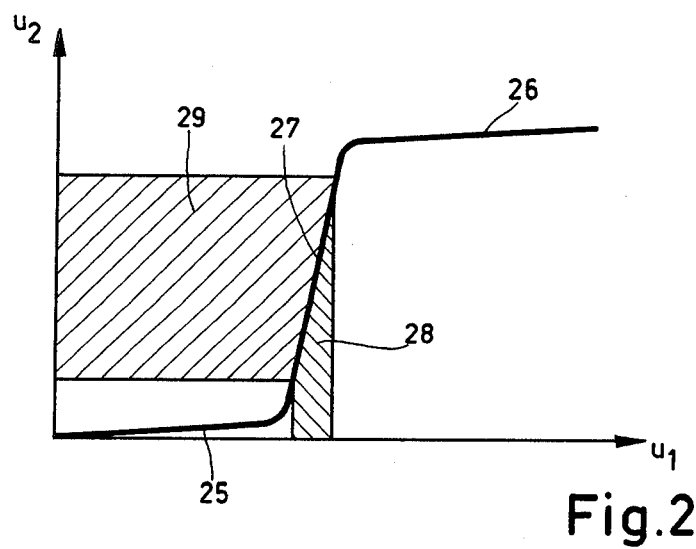
FIG. 2 shows the characteristic of the amplitude discriminator used in the dropout detector of FIG. 1.

In accordance with the invention the signal path before the threshold device 23, in the present example before the rectifier circuit 21, includes an amplitude discriminator 24, whose discriminator characteristic between two threshold levels of the output signal exhibits a steep edge for amplitude discrimination, in whose range the signal level which is the criterion for the actuation of the threshold device is situated. FIG. 2 shows the characteristic of such an amplitude discriminator, the applied input signal being plotted on the abcissa and the supplied output signal on the ordinate. The reference numerals 25 and 26 refer to threshold level, between which the characteristic exhibits a steep edge 27. Thus, an input signal whose level is situated in the range of the steep edge 27, causes a large variation in the output signal for a small variation of said input signal, as indicated by the hatched areas 28 and 29 for the input signal on the one hand and for the output signal on the other hand. If the level of the input signal is situated in the range of the threshold level 26, as in the case of a signal without dropout, a variation of this signal produces substantially no variation in the output signal, which similarly applies to an input signal with a level which is situated in the range of the other threshold level 25, as is the case when a pronounced dropout appears.

If the discriminator characteristic and the threshold values of the threshold device are defined so that the signal levels which correspond to the threshold values are situated in the range of the slope 27 of the amplitude discriminator, also if allowance is made for possible tolerances, the amplitude discriminator will provide effective amplitude discrimination, no matter whether a definitely undisturbed signal, a definitely disturbed signal, or a signal which is just situated in the detection range for the occurrence of a dropout appears, the signal level being situated in the range of the slope 27 in the last-mentioned case. As the range 28 between the threshold level 26 and the threshold level 25 is very narrow owing to the shape of the characteristic of the amplitude discriminator for its input signal, a small variation of the input signal will already result in the large variation of the output signal in this range, thus assuring that it covers the total tolerance range, within which the threshold values of the threshold device can lie. In other words, the action of the amplitude discriminator may be compared with that of a magnifying glass by means of which the critical signal level range is observed within which the detection of a dropout must be effected. Thus, special steps for absolutely exactly defining the threshold values of the threshold device are no longer necessary, because these values may lie within a certain tolerance range without the accurate detection of a dropout being impaired.

Figure 3:
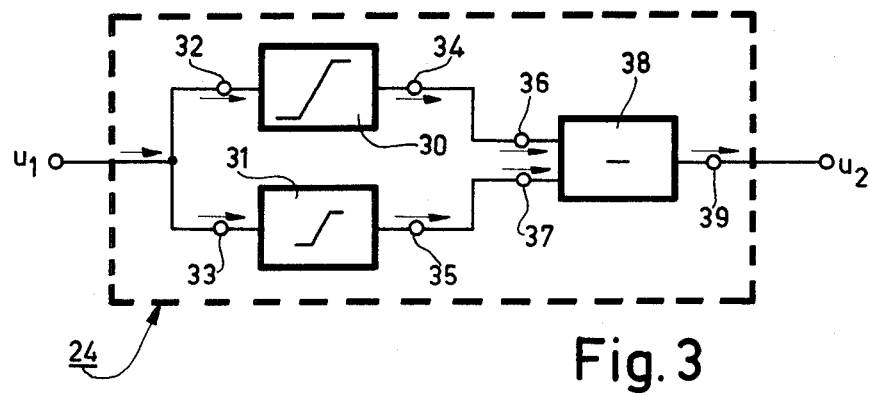
FIG. 3 shows the block diagram of an amplitude discriminator constituted by two amplifiers.

In the amplitude discriminator 24 shown in FIG. 3 two amplifiers 30 and 31 are included whose inputs 32 and 33 are connected in parallel and whose outputs 34 and 35 are each connected to an input 36 and 37 respectively of a subtractor stage 38, at whose output 39 the output signal of the amplitude discriminator is available. The two amplifiers 30 and 31 have different signal limiting levels, but supply equal output signals in the common linear amplification range. In the arrangement constituted by the subtractor stage 38 the output signals of the two amplifiers are combined, resulting in a compensation of these signals in the common linear amplification range of the two amplifiers, because they are equal in this range. Thus, a characteristic is obtained as is in principle shown in FIG. 2. Obviously, it would also be possible to use an adder stage instead of the subtractor stage 38 in such a circuit arrangement, if one of the two amplifiers 30 and 31 supplies an output signal of inverse polarity relative to that of the other amplifiers. Amplitude discriminators of this type have a large bandwidth as is required for processing phase modulated signals. Furthermore, the variation of the discriminator characteristic can simply be adapted by selection of the gain and the signal limiting levels.

Figure 4:
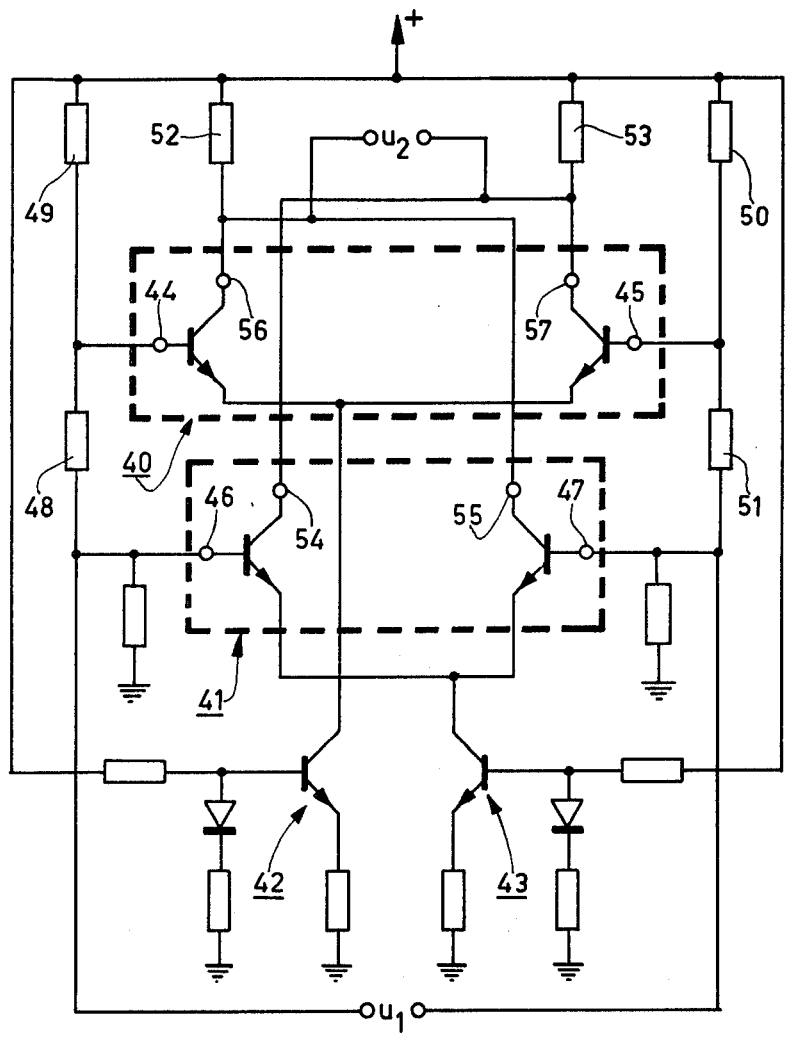
FIG. 4 is a detailed circuit diagram for an amplitude discriminator with two differential amplifiers.

In the amplitude discriminator of FIG. 4 two differential amplifiers 40 and 41 are included, which are each energized by a constant current source 42 and 43 respectively, which supply limiting currents which differ by a predetermined factor. The inputs 44, 45 and 46, 47 respectively of the two differential amplifiers are connected to a resistor network 48, 49, 50 and 51 through which the input signal is passed, which ensures that the input signals appearing at the inputs of the differential amplifier differ from each other by a predetermined factor. In the present instance the input signal appearing at the differential amplifier 41 is greater than that at the differential amplifier 40, while if the resistors 48, 49, 50 and 51 are assumed to be equal the difference between the input signals is a factor two. Furthermore, the circuit arrangement has been designed so that the factor by which the input signals of the two differential amplifiers differ from each other equals the factor by which the limiting currents of the two constant-current sources differ, while furthermore care has been taken that the differential amplifier which is energized by the constant current source with the greater limiting current receives the smaller input signal. In the present example, the constant current source 42 should consequently supply a greater limiting current than the constant current source 43, namely in the above mentioned numerical example a limiting current which is twice as great. Finally, the two differential amplifiers have common load resistors 52 and 53, across which the output signals appear in phase opposition, which in the present example is achieved in that the outputs 54, 55 of the differential amplifier 41 are connected crosswise to the outputs 56, 57 of the differential amplifier 40. Such a circuit arrangement is particularly suitable for being realized in integrated circuit technology, while the desired shape of the discriminator characteristic can be obtained by simple measures in respect of dimensioning, namely by defining voltage and current ratios and not by defining the corresponding absolute values of those quantities.

Thus, as in the example of FIG. 3, two amplifiers with different signal limiting levels are obtained again, which in the common range of linear gain of the two amplifiers supply equal output signals, which in the circuit which in the present instance is constituted by the common load resistors 52, 53 of the two differential amplifiers, are mutually compensated, so that again the basic characteristic shown in FIG. 2 is obtained.

It is evident that a series of modifications to the embodiments described hereinbefore are possible, without departing from the scope of the invention, in which respect in particular the various possibilities are to be noted for the manner in which the amplitude discriminator is designed and its inclusion in the signal path of the dropout detector, in which it may for example also be included after the rectifier circuit.

What is claimed is:

1. A circuit arrangement for detecting dropouts in the reproduction of signals which are recorded on a record carrier, comprising a threshold device means switchable from a first stable state to a second stable state in response to an input signal exceeding a first predetermined signal level and switchable to a second stable state in response to a signal falling below a second predetermined signal level for providing a different output signal in each of said stable states, and an amplitude discriminator means connected to an input of said threshold device means and receiving said reproduced recorded signals for amplifying said reproduced recorded signals in a signal range between said first and second predetermined signal levels to a much greater extent that said reproduced recorded signals outside said signal range.

2. A circuit arrangement as recited in claim 1, wherein the amplitude discriminator means comprises two amplifiers with different signal limiting levels, said amplifiers supplying equal output signals in a linear amplification range that is common for the two amplifiers, said amplifiers being arranged for mutual compensation.

3. A circuit arrangement as claimed in claim 2, further comprising two constant current sources wherein each of the two amplifiers comprises a differential amplifier which is energized by one of the constant-current sources, said two constant-current sources supplying limiting currents which differ by a predetermined factor, the input signals applied to the inputs of the two differential amplifiers differing by the same factor, a smaller of the two input signals being applied to the differential amplifier which is energized by the constant current source with the larger limiting current, and the two differential amplifiers having common load resistors across which the output signals appear in phase opposition.

4. Apparatus for reproducing signals stored on a record carrier, comprising a playback head means for sensing the stored signals, an amplifier connected to said playback head for amplifying said sensed stored signals, a threshold device means switchable from a first stable state to a second stable state in response to an input signal exceeding a first predetermined signal level and switchable to a second stable state in response to an input signal falling below a second predetermined signal level and for providing a different output signal in each of said stable states, and an amplitude discriminator means connecting said amplifier to said threshold device means for amplifying said sensed recorded signals in a signal range between said first and second predetermined signal levels to a much greater extent than said sensed amplified signals outside said signal range.

5. Apparatus as recited in claim 4, wherein said amplitude discriminator means comprises two additional amplifiers with different signal limiting levels, said additional amplifiers supplying equal output signals in a linear amplification range which is common for the two additional amplifiers, said additional amplifiers being arranged for mutual compensation.

6. Apparatus as claimed in claim 5, further comprising two constant current sources wherein each of the two additional amplifiers comprises a differential amplifier which is energized by a different one of said constant-current sources, the two constant-current sources supplying limiting currents which differ by a predetermined factor, the input signals applied to the inputs of the two differential amplifiers differing by the same factor, the smaller input signal being applied to the differential amplifier which is energized by the constant current source with the larger limiting current, and the two differential amplifiers having common load resistors across which the output signals appear in phase opposition.

* * * * *